US011703933B2

(12) United States Patent
Ma et al.

(10) Patent No.: US 11,703,933 B2
(45) Date of Patent: Jul. 18, 2023

(54) REMOTE REGISTER UPDATES

(71) Applicant: Intel Corporation, Santa Clara, CA (US)

(72) Inventors: Liang Ma, Shannon (IE); Weigang Li, Shanghai (CN); Madhusudana Raghupatruni, Bangalore (IN); Hongjun Ni, Shanghai (CN); Xuekun Hu, Shanghai (CN); Changzheng Wei, Shanghai (CN); Chris MacNamara, Limerick (IE); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 16/747,202

(22) Filed: Jan. 20, 2020

(65) Prior Publication Data
US 2020/0150734 A1 May 14, 2020

Related U.S. Application Data

(60) Provisional application No. 62/796,313, filed on Jan. 24, 2019.

(51) Int. Cl.
*G06F 9/54* (2006.01)
*G06F 1/324* (2019.01)
(Continued)

(52) U.S. Cl.
CPC ............. *G06F 1/324* (2013.01); *G06F 9/544* (2013.01); *G06F 21/53* (2013.01); *G06F 21/606* (2013.01); *G06F 2221/032* (2013.01)

(58) Field of Classification Search
CPC .......... G06F 1/324; G06F 1/53; G06F 1/3243; G06F 1/329; G06F 9/544; G06F 21/606; G06F 21/53; G06F 2221/032; Y02D 10/00
See application file for complete search history.

(56) References Cited

U.S. PATENT DOCUMENTS 9,841,807 B2 * 12/2017 Jahagirdar ............ G06F 1/3275
10,147,464 B1 * 12/2018 Wen .................... G06F 11/3024
(Continued)

OTHER PUBLICATIONS

Hunt, Dave, et. al., "Recent Power Management Enhancements in DPDK", DPDP Data Plane Development Kit, Sep. 2018, 16 pages.
(Continued)

*Primary Examiner* — Brian F Shaw
(74) *Attorney, Agent, or Firm* — Compass IP Law PC

(57) ABSTRACT

Examples described herein provide for a first core to map a measurement of packet processing activity and operating parameters so that a second core can access the measurement of packet processing activity and potentially modify an operating parameter of the first core. The second core can modify operating parameters of the first core based on the measurement of packet processing activity. The first and second cores can be provisioned on start-up with a common key. The first and second cores can use the common key to encrypt or decrypt measurement of packet processing activity and operating parameters that are shared between the first and second cores. Accordingly, operating parameters of the first core can be modified by a different core while providing for secure modification of operating parameters.

30 Claims, 15 Drawing Sheets

(51) Int. Cl.
    *G06F 21/60*    (2013.01)
    *G06F 21/53*    (2013.01)

(56) References Cited

U.S. PATENT DOCUMENTS

| | | | |
|---|---|---|---|
| 2016/0091958 A1* | 3/2016 | Jahagirdar | G06F 12/0875 |
| | | | 713/323 |
| 2019/0041957 A1 | 2/2019 | Hunt et al. | |

OTHER PUBLICATIONS

Intel, "Intel 64 and IA-32 Architectures Software Developer's Manual", vol. 3 (3A, 3B, 3C & 3D): Systen Programming Guide, Sep. 2016, 1998 pages.

Intel, "Intel Microarchitecture Codename Nehalem Performance Monitoring Unit Programming Guide (Nehalem Core PMU)", Intel Programming Guide, Copyright 2010 Intel Corporation, 59 pages.

"SLEEP: (Sleep or usleep) is not suspending everything in my thread in Linux but it does in Windows? why?", https://stackoverflow.com/questions/56842886/sleep-sleep-or-usleep-is-not-suspending-everything-in-my-thread-in-linux-but, Jul. 1, 2019, 2 pages.

Baydan, Ismail, "What Is sleep( ) function and How To Use It In C Program?", https://www.poftut.com/what-is-sleep-function-and-how-to-use-it-in-c-program/. Aug. 28, 2018, 6 pages.

\* cited by examiner

REMOTE REGISTER UPDATES

RELATED APPLICATION

The present application claims the benefit of a priority date of U.S. provisional patent application Ser. No. 62/796,313, filed Jan. 24, 2019, the entire disclosure of which is incorporated herein by reference.

DESCRIPTION

Data Plane Development Kit (DPDK) can provide high performance packet processing on a multitude of computing platforms. DPDK employs a busy-polling working model whereby a core repeatedly reads registers of a network interface to determine how many packets have arrived or reviews a queue to determine a number of received packets. DPDK polls for received packets on every clock cycle regardless of network activity level or whether any packet has been received by the network interface. This polling activity can be costly from a power use perspective as the core can poll for received packets but there are no new received packets. Adjusting power management registers to reduce the clock frequency and reduce the polling rate involves reading performance monitoring unit (PMU) registers to determine how to adjust the DPDK-related processing activity level to improve power use efficiency. In some scenarios, DPDK processes and a power management process are required to run on the same core. Accordingly, some PMU registers are only allowed to be accessed by a power management process running on the local (same) CPU core as that of the DPDK process.

DETAILED DESCRIPTION

Some operating system (OS) kernels must schedule a kernel level task to a specific core to issue a read/write command for a specific model specific register (MSR). If an application needs to read the PMU registers in core 0, the read command must be issued from core 0. Accordingly, to review PMU registers or adjust settings of the DPDK process, DPDK (operating in user space as opposed to kernel space) is interrupted by a power management process frequently, in order to swap to kernel space to issue MSR read/write commands to read/write PMU registers. Switching from user space to kernel space and back to user space introduces latency (e.g., saving process state, saving context, context switch) and negatively impacts DPDK packet processing performance, particularly when DPDK is running at full speed. If the core is running a high performance or intensive service such as DPDK for packet processing, the service will have to be paused and the performance can be impacted greatly. Accordingly, performance requirements in service level agreements (SLAs) with a customer may not be achieved or met, which is not acceptable to the customer.

Figure 1:
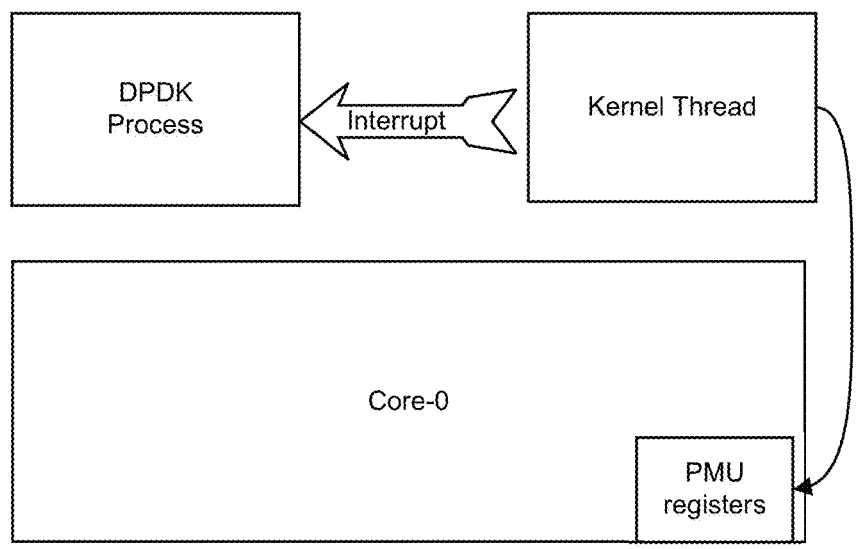
FIG. 1 illustrates operation of an environment in which a DPDK packet processing process and management processes run on the same core.

FIG. 1 illustrates operation of an environment in which a DPDK packet processing process and management processes run on the same core. The kernel thread which handles MSR read/write must run on the same core as the power management process so that the power management process can access and modify the PMU registers. This environment can suffer from a slowdown in packet processing when power management operations take place (e.g., changes to frequency of operation of a core).

Another solution uses a Linux® "usleep" to free up the central processing unit (CPU) when the DPDK workload activity is low whereby the DPDK process sleeps (e.g., does not perform packet processing) for a specific time and wakes up again to poll for received network packets. However, a duration of a sleep time can be challenging to determine. When packets are received at a network interface during a DPDK sleep time, they are not processed until after DPDK wakes up. This solution can introduce delays in processing of received packets while the DPDK process sleeps, which can lead to performance requirements in SLAs not being achieved or met.

Various embodiments provide for a first core to map a measurement of packet processing activity and operating parameters of the first core so that a second core can access the measurement of packet processing activity and operating parameters and potentially modify the operating parameters of the first core. A measurement of packet processing activity and operating parameters can include information in registers (e.g., Power and Thermal Management (PTM) or Power Management Unit (PMU)). The first core can copy the measurement of packet processing activity and operating parameters to a shared register used by a system agent or other register address space, cache, or memory region. The shared register can be accessed by the second core too, as well as other cores or processors.

The measurement of packet processing activity and operating parameters can be encrypted by the first core with a secure key, so only the authorized process executed by the second core (or other core) can decrypt and authenticate the content. In addition, or alternatively, the authorized process executed by the second core (or other core) can decrypt content or data by use of a secure enclave. Any CPU or core can read the shared register but only authorized processes that use the secure key can decrypt the content in the shared register. Unauthorized writing of content into the shared register can be identified by content not being properly authenticated during decryption because the writer of the content does not use the proper secure key. For example, a virtual machine or container cannot snoop another core's sensitive registers to construct a side channel attack vector to obtain keys or management content or modify operating parameters or register content as such registers are available by use of the proper secure key.

For example, the key can be configured in a Basic Input/Output System (BIOS) executed by the first and second cores (or other cores). In some examples, a Universal Extensible Firmware Interface (UEFI) can be used instead or in addition to a BIOS for booting or restarting cores. In some examples, a BIOS can be stored on a device and accessible from the device by one or more cores or CPUs using an interface such as Serial Peripheral Interface (SPI) or other interface. The key can be stored in a secure enclave (e.g., accessible using Intel® secure guard extensions (SGX), instructions that increase the security of data or application code, hardware-based memory encryption that isolates specific data or application code in memory, a secure region of memory, or a secure processor that can authorize only specific instructions from trusted sources). The second core can access the encrypted content from the shared register and decrypt the content using the secure key. The second core can execute a power management process that determines whether to modify operating parameters of the first core. Accordingly, a data plane and management plane can be decoupled and run on different CPU cores so that a management plane (e.g., polling rate or core frequency adjustment) does not interrupt the data plane (e.g., packet processing). Moreover, the BIOS can be configured to monitor for changes to particular registers of the first core and trigger encryption and copying operations of register content to a shared register.

Figure 2A:
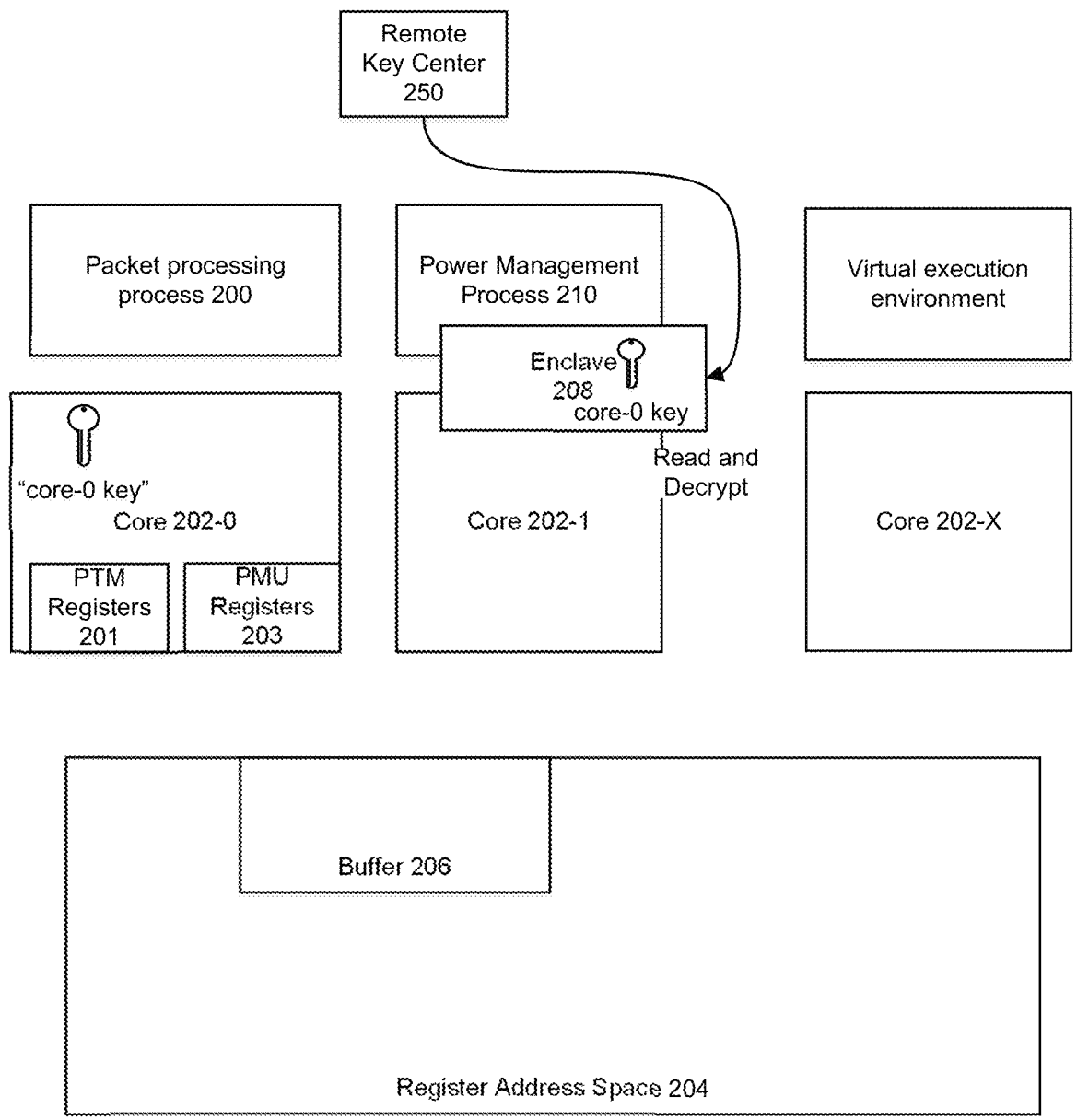
FIGS. 2A-2C depict an example where packet processing and power management processes are handled by different cores.
Figure 2B:
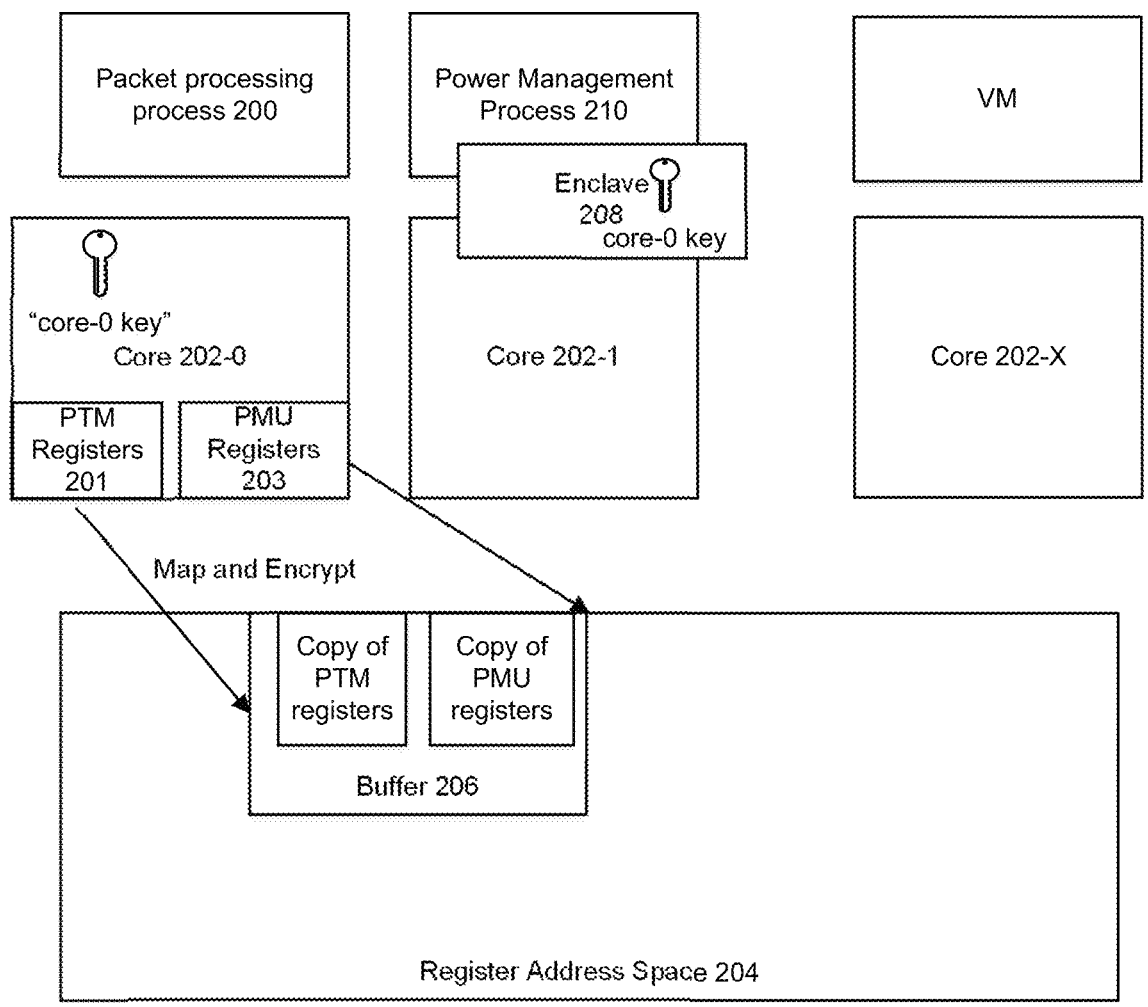
Figure 2C:
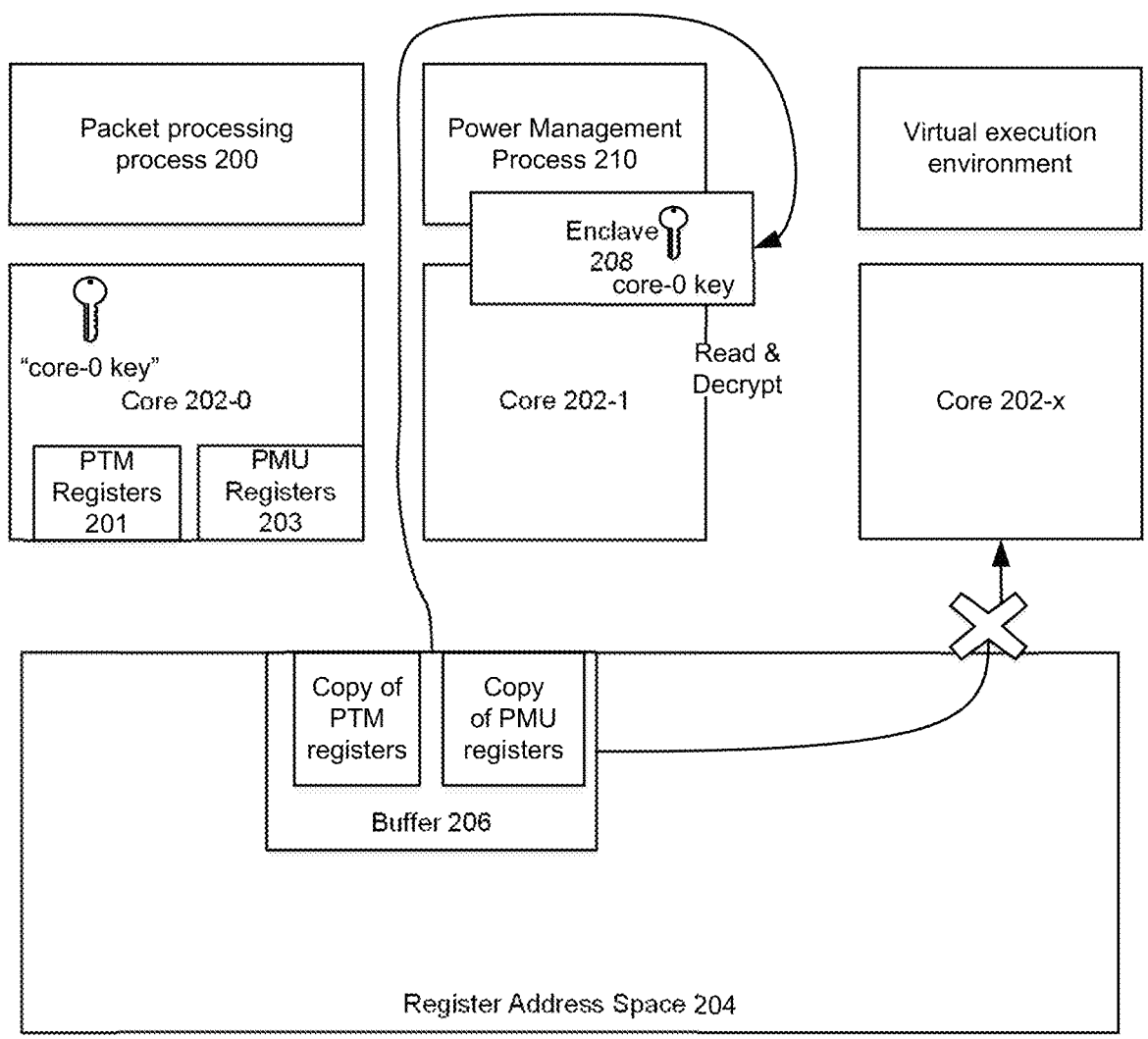

FIGS. 2A-2C depict an example where packet processing and power management processes are handled by processes executed on different cores. In this example, core 202-0 can execute a packet processing process 200 as an application or part of a virtual execution environment. Packet processing process 200 can perform processing of received packets such as one or more of: determination if a packet is valid (e.g., correct Ethernet type, correct checksum, correct IP Protocol type, valid layers 4-7 protocol type), determination of packet destination (e.g., next hop, destination queue), match-action activity, or perform one or more of: IP filter checks, flow table lookup, access control lists (ACL), firewall, match-actions operations, outgoing port selection using a forwarding table, packet decryption, packet encryption, denial of server protection, packet counting, billing, traffic management/conditioning, traffic shaping/traffic scheduling, packet marking/remarking, packet inspection of layers 4-7, or traffic load balancing/load distribution. For example, packet processing process 200 can perform Data Plane Development Kit (DPDK) or OpenDataPlane (ODP) compatible packet processing.

A packet can include a header and payload. A header can be a media access control (MAC) source and destination addresses, Ethertype, Internet Protocol (IP) source and destination addresses, IP protocol, Transmission Control Protocol (TCP) port numbers, virtual local area network (VLAN) or Multi-Protocol Label Switching (MPLS) tags.

Packet processing process 200 can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

As described in more detail herein, core 202-1 can execute a power management process 210 that can determine whether to modify operating parameters of core 202-0 or packet processing process 200. Accordingly, one core (core 202-0) can execute packet processing tasks and another core (core 202-1) can execute power management processes that control activities of core 202-0.

A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh.

A core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein.

FIG. 2A shows an example where a remote key center 250 can provision core 202-0 and core 202-1 to receive a key shown as core-0 key. Remote key center 250 can be a hypervisor or system administrator in the same rack or data center or different rack or data center as that which includes cores 202-0 and 202-1. Access to core-0 key can be provisioned on execution of a BIOS by core 202-0 and/or core 202-1. For example, a BIOS can be instructions for core initialization during a booting process (e.g., power-on, startup, or restart) and provide runtime services for operating systems and programs.

Core 202-0 can use a key (core-0 key) to encrypt registers (or any portion thereof) that store measurement of packet processing activity and/or operating parameters of core 202-0. The key can be setup during system initialization of core 202-0 and core 202-1. In this example, registers are PTM registers 201 and PMU registers 203. Content of registers can include operational performance or settings of core 202-0 such as branch hit/miss measurements of PMU register 203. A branch hit measurement can refer to a count of when a last micro op (uop) or hardware operation retires. A branch miss measurement can be a count of when the last micro op of a branch instruction retires which corrected misprediction of a branch prediction hardware at execution time. For example, with reference to Intel 64 and IA-32 Architectures Software Development Manual SDM volume 3, branch hit and branch miss can be represented by respective event numbers C4H and C5H of Table 19.1. A branch hit/miss measurement can be an indication if whether a speculative packet processing operation took place on invalid data (e.g., no received packet is identified after polling the network interface) and therefore identifies excessive packet processing attempts. If data speculation is permitted, whereby an arithmetic logic unit (ALU) is allowed to perform calculations upon operands which are not yet known to be valid. Some number of clock cycles later, the branch hit/miss measurement may signal that the speculated data is, in fact, invalid. For an example implementation of use of branch hits and misses to determine core activity, see commonly assigned U.S. Patent Application Publication 20190041957, entitled "TECHNOLOGIES FOR PROVIDING EFFICIENT DETECTION OF IDLE POLL LOOPS."

In some examples, Intel® running average power limit (RAPL) can be used to detect average power use over a period of time to determine if a core is active or inactive with respect to packet processing activity or other activity. RAPL provides a set of counters that indicate energy and power consumption information of a core or CPU for example. If RAPL is determined to be lower than a threshold, the polling rate or core frequency of a core that performs packet processing can be lowered.

For example, a change in PTM registers 201 and/or PMU registers 203 can trigger encryption of content in PTM registers 201 and/or PMU registers 203 and copying of encrypted content to buffer 206. For example, an update in branch hit/miss measurement. In some examples, an expiration of a timer causes encryption and copying of PTM registers 201 and/or PMU registers 203 to buffer 206.

In some cases, core 202-0 can generate a hash-based message authentication code (HMAC) computed over an encrypted content from PTM registers 201 and/or PMU registers 203 of core 202-0 and write the encrypted content and HMAC into buffer 206 of register address space 204. An HMAC can be represented by the function HMAC(Encrypted Data, core-0 key) where the core-0 key is used to generate an HMAC. Any type of hash can be used to compute the HMAC such as SHA-256 or SHA-3. For an example of an HMAC, see Bellare, Mihir; Canetti, Ran; Krawczyk, Hugo, "Keying Hash Functions for Message Authentication" (1996).

PTM registers (or a portion thereof) can be part of an MSR. For example, MSR can include control registers used for program execution tracing, toggling of compute features, and/or performance monitoring. The MSR can include one or more of: memory order buffer (MOB) control and status; page fault error codes; clearing of page directory cache and TLB entries; control of the various cache memories in the cache hierarchy of the microprocessor, such as disabling portions or all of a cache, removing power from portions or all of a cache, and invalidating cache tags; microcode patch mechanism control; debug control; processor bus control; hardware data and instruction pre-fetch control; power management control, such as sleep and wakeup control, state transitions as defined by ACPI industry standards (e.g., P-states and C-states), and disabling clocks or power to various functional blocks; control and status of instruction merging; ECC memory error status; bus parity error status; thermal management control and status; service processor control and status; inter-core communication; inter-die communication; functions related to fuses of the microprocessor; voltage regulator module VID control; PLL control; cache snoop control; write-combine buffer control and status; overclocking feature control; interrupt controller control and status; temperature sensor control and status; enabling and disabling of various features, such as encryption/decryption, MSR password protection, making parallel requests to the L2 cache and the processor bus, individual branch prediction features, instruction merging, microinstruction timeout, performance counters, store forwarding, and speculative table walks; load queue size; cache memory size; control of how accesses to undefined MSRs are handled; multi-core configuration; configuration of a cache memory (e.g., de-selecting a column of bit cells in a cache and replacing the column with a redundant column of bit cells), duty cycle and/or clock ratio of phase-locked loops (PLLs) of the microprocessor, and the setting voltage identifier (VID) pins that control a voltage source to the microprocessor.

Buffer 206 can be allocated in register address space 204. Register address space 204 can be part of an uncore or system agent register address space. Registers, cache and memory can store data that can be directly accessed by the processor. A cache or memory can be accessed through a memory address. Registers can be explicitly referenced in executed instructions. An uncore or system agent register address space can include one or more of: registers, cache, or a region in memory (volatile or non-volatile).

An uncore or system agent can include one or more of: a memory controller, a shared cache, a cache coherency manager, arithmetic logic units, floating point units, core or processor interconnects, or bus or link controllers. An uncore or system agent may not include a core. An uncore or system agent can provide access to external devices using links such as one or more of: a PCI express (PCIe) link compliant for example with PCIe Specification Version 4.0 (2017) and earlier or later version, an Intel® Ultra Path Interconnect (UPI) link, an Intel® QuickPath Interconnect (QPI), or a System Management Bus (SMBus) link. An uncore or system agent can provide one or more of: direct memory access (DMA) engine connection, non-cached coherent master connection, data cache coherency between cores and arbitrates cache requests, or Advanced Microcontroller Bus Architecture (AMBA) capabilities.

FIG. 2B shows that core 202-0 can store encrypted content copied from PTM registers 201 and/or PMU registers 203 into buffer 206. For example, encrypted packet processing activity and operating parameters and an HMAC (not shown) can be stored into buffer 206.

FIG. 2C shows an example where a power management process 210 executing on core 202-1 reads registers (or any portion thereof) from buffer 206. Power management process 210 can periodically poll for updates to shared buffer 206. In some examples, when the shared (e.g., uncore) register address space has an update, the uncore or system agent notifies the second core, and the second core can pull (copy) the revised registers and HMAC from buffer 206. For example, in response to detection of an update to shared buffer 206, core 202-1 executing a power management process 210 with use of a secure enclave 208 can read PMU registers 203, decrypt the content of PMU registers 203 using core-0 key. In some examples, if an HMAC is appended or provided with the copy of register content in buffer 206, power management process 210 computes an HMAC value of the encrypted data based on core-0 key and compares the computed HMAC value with the HMAC value read from buffer 206. For example, if only core 202-0 and core 202-1 use core-0 key, then generation of an expected HMAC value can identify core 202-0 or core 202-1 as a source of content in buffer 206. If more than two cores share use of a key, an expected HMAC value can identify any other core as a source of content in buffer 206. If there is a match, power management process 210 decrypts and/or accesses a copy of the PTM and/or PMU registers in buffer 206. Otherwise, power management process 210 will discard the content or ignore the content.

Enclave 208 can be an isolated processor and/or memory region. Enclave 208 can be accessed using core 202-1 or a different secure enclave processor. A secure enclave can be provided whereby core 202-1 runs a dedicated microkernel and undergoes a secure boot process separate from the rest of the device. Enclave 208 can provide for execution of instructions that allocate private regions of memory that are protected from processes running at higher privilege levels or other processors except for processes designated to operate on content in the enclave. Enclave 208 can store processor-executable instructions of power management process 210. Enclave 208 can be formed in a secure and privileged region of memory or cache that is accessible only to core 202-1. Enclave 208 can be an isolated memory region that prohibits access to core-0 key from other processes and cores than core 202-1. In some examples, enclave 208 can be used to store core-0 key.

In some examples, the memory region allocated to enclave 208 is encrypted and only the code running in enclave 208 can access and decrypt it. In some examples, power management process 210 uses enclave 208. Power management process 210 can retrieve core-0 key from enclave 208, copy content of buffer 206 (e.g., register content and/or HMAC) to enclave 208, and use the key to validate the HMAC and decrypt content stored in enclave 208.

Power management process 210, operating on core 202-1, can perform a determination of performance of packet processing process 200 operating on core 202-0 based on content in PMU registers 203. After validation and decryption, power management process 210 executing on core 202-1 can read "branch hit/miss" content from PMU registers 203 via buffer 206 to determine a branch hit/miss ratio to determine if a network interface is busy from the processing of received packets or idle (e.g., underutilized as there are resources available to process received packets but insufficient packets). PMU registers 203 can be read-only in some cases. In some cases, a branch hit/miss ratio (e.g., branch hit/branch miss) that exceeds a threshold indicates the network packet processing is idle whereas branch hit/miss ratio that is at or below a threshold indicates the network packet processing is active.

In a case where the network packet processing is idle, power management process 210 modifies at least a portion of a copy of the Power and Thermal Management (PTM) registers (obtained via buffer 206) to reduce the power frequency (e.g., core operating frequency) for packet processing process 200 executing on core 202-0. Where the received packets are to be processed or recognized faster, power management process 210 executing on core 202-1 can increase the packet processing frequency of packet processing process 200. Examples of manner of modifying operating parameters of core 202-0 are described herein.

For example, a non-permitted or non-privileged process does not have access to the core-0 key or content of registers of core 202-0. In this example, core 202-x executing a virtualized execution environment can attempt to access any copies of PTM registers 201 or PMU registers 203 but without core-0 key, the virtualized execution environment is unable to decode content of the PTM registers 201 or PMU registers 203. The virtualized execution environments running on the other CPU cores can read the PMU registers but cannot decrypt the register data as they do not have the secure key to ensure the PMU registers are secure and used by the authorized process only.

Figure 3A:
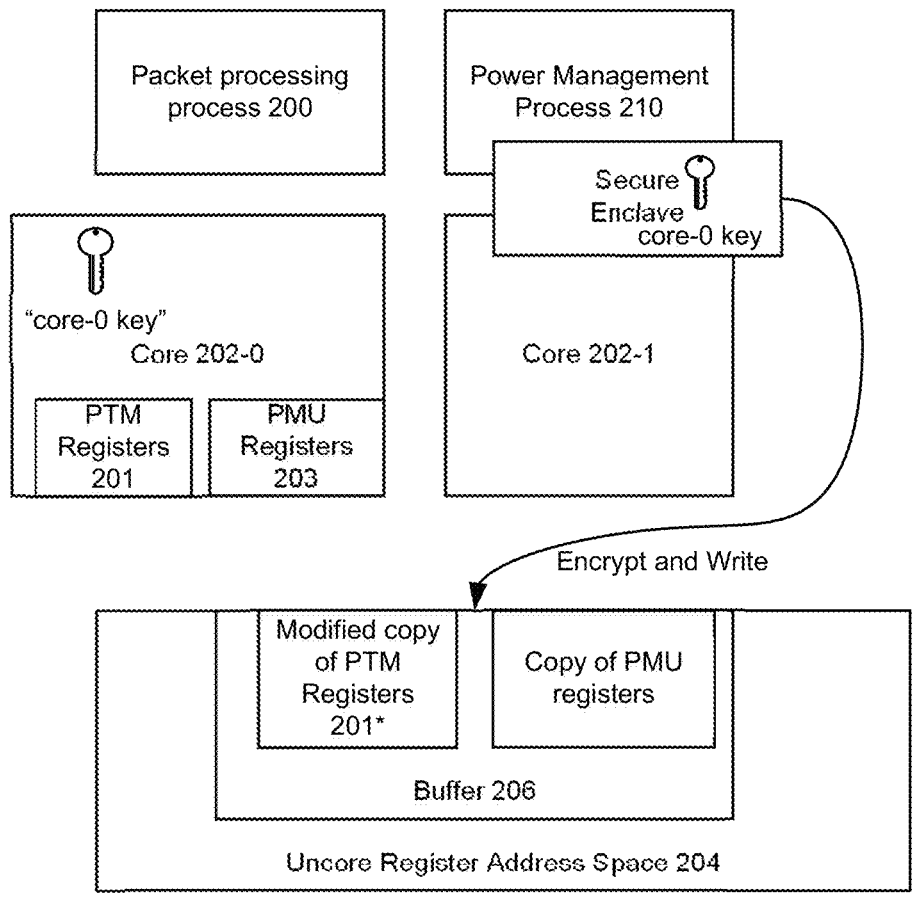
FIGS. 3A-3B illustrate an example whereby a core can modify settings of another core.
Figure 3B:
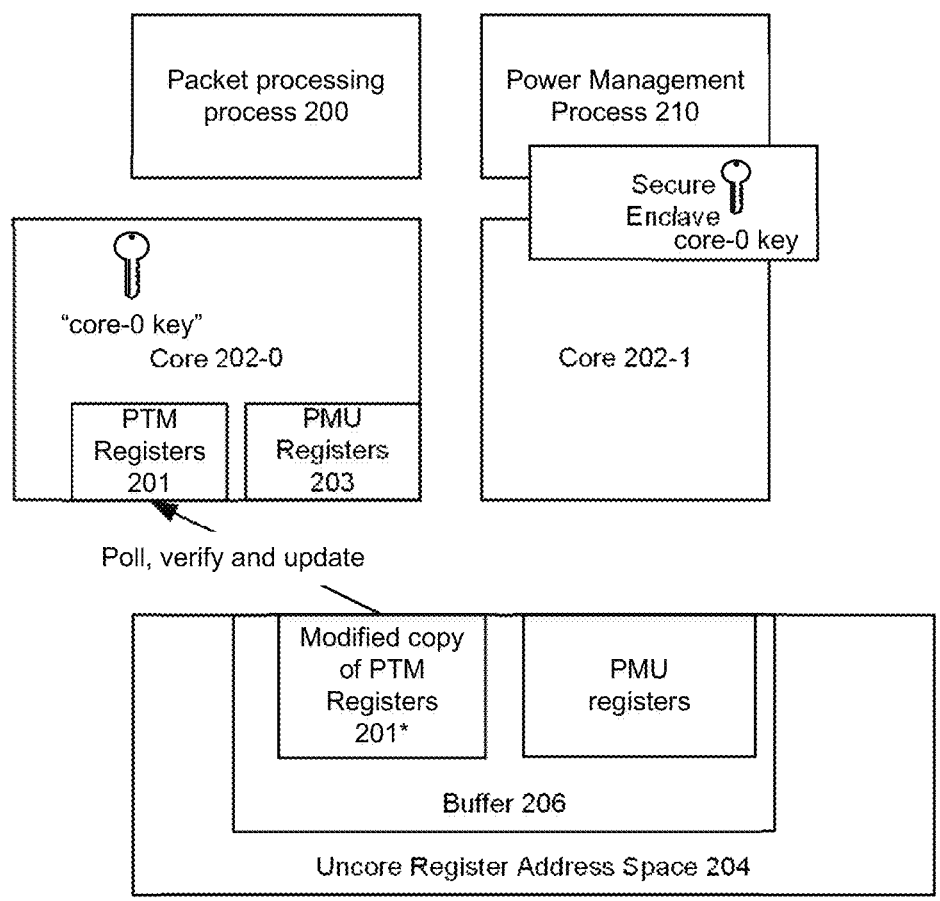

FIGS. 3A-3B illustrate an example whereby a core can modify settings of another core. In this example, power management process 210 executing on core 202-1 determines that a branch hit ratio is above a threshold and that network processing activity is idle or low enough that power management process 210 decides to reduce power frequency of core 202-0, which decreases a polling rate of packet processing process 200. In some examples, power frequency of core 202-0 can be reduced by modifying settings in a PTM register 201. In other examples, power management process 210 can determine network processing activity is high enough that power management process 210 decides to increase power frequency of core 202-0 by changing a setting in PTM register 201, which increases a polling rate of packet processing process 200 (and corresponding packet processing rate).

FIG. 3A shows power management process 210 executing on core 202-1 determines to adjust a polling frequency of core 202-0 by modifying a power frequency in a copy of PTM registers 201*, encrypting the modified PTM registers 201* (or portion thereof) with core-0 key and writing the encrypted modified PTM registers 201* (or portion thereof) to buffer 206. If an HMAC is used, the process of determining an HMAC is similar to that performed by core 202-0 except as applied to encrypted content of modified PTM registers 201*. The HMAC is copied to the buffer 206 (not shown).

FIG. 3B shows core 202-0 polling buffer 206 to copy a modified version of PTM registers 201* from buffer 206. Core 202-0 or its agent or process can periodically poll for updates to shared buffer 206. When the shared (e.g., uncore) register address space has an update, the uncore or system agent notifies the first core, and the first core can pull (copy) the revised content and HMAC from shared buffer 206. For example, in response to detection of an update to shared buffer 206, any content of buffer 206 can be read to update any register used by core 202-0. Core 202-0 can use core-0 key to decrypt the PTM registers 201*. If the content has an appended HMAC, core 202-0 can verify that the updated version of PTM registers 201* are authentic (or from a trusted sender or source) by verifying the HMAC. If the HMAC is verified, the updated version of PTM registers 201* are decrypted using core-0 key and core 202-0 updates PTM registers 201 with the change(s) made by power management process 210. However, if either the HMAC is invalid or the content is not decrypted successfully, the read contents are discarded and an error alert can be sent to a hypervisor or system administrator.

Accordingly, a rate of polling is adjusted by a process run on a separate core and the packet processing process 200 does not need to be interrupted to adjust the rate of polling of core 202-0. In other words, core 202-0 can continue to perform packet processing process 200 uninterrupted by changes to operating settings of core 202-0 while operating characteristics of core 202-0 are being modified.

Figure 3C:
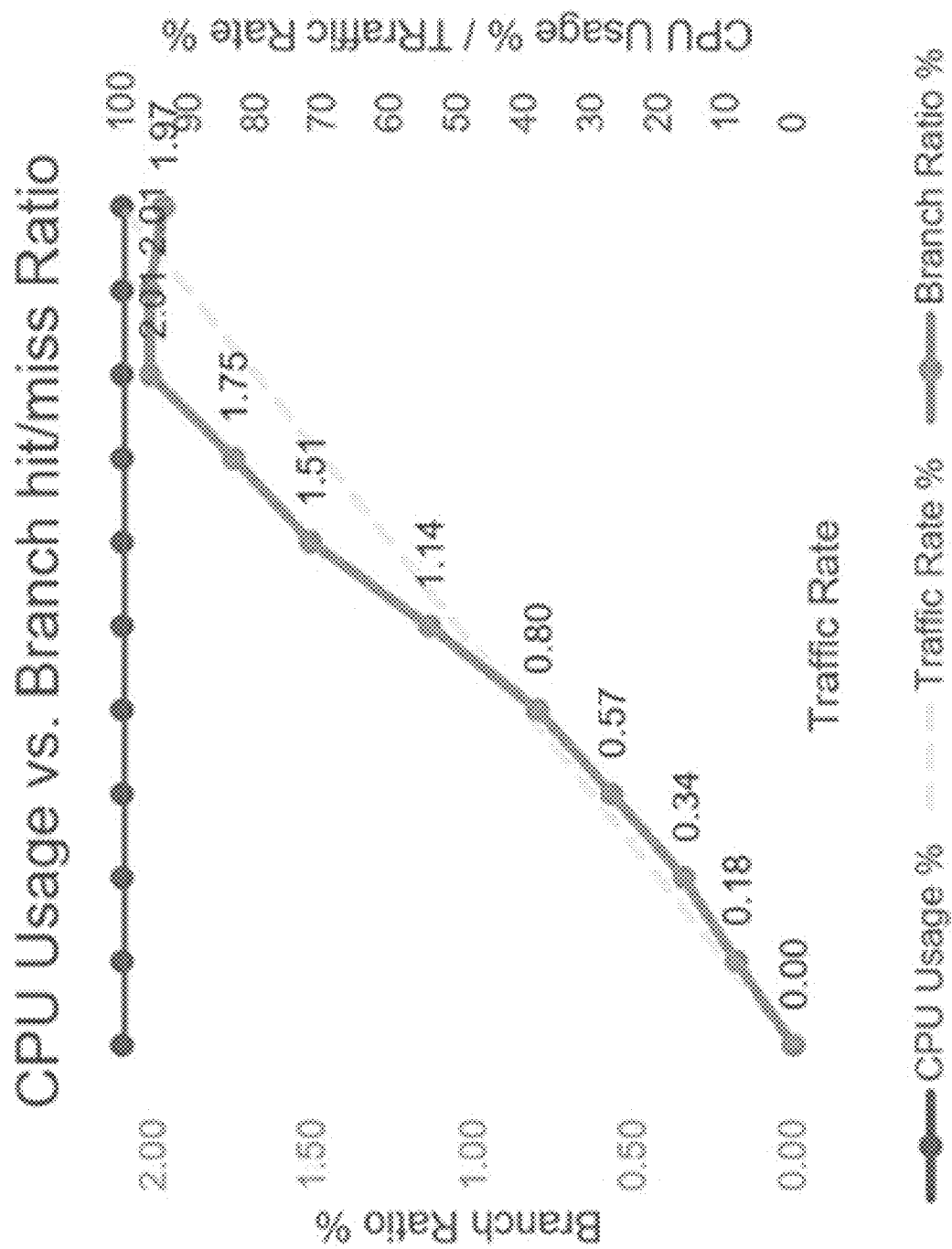
FIG. 3C shows an example of correlation between workload and branch hit to branch miss ratio.

FIG. 3C shows an example of correlation between workload and branch hit to branch miss ratio. A ratio of branch hit divided by branch miss is correlated with packet processing activity of received packets. In some examples, a higher ratio of (branch hit divided by branch miss) can indicate a lower level of received packet processing whereas a lower ratio of (branch hit divided by branch miss) can indicate a higher level of received packet processing. If few or no packets are available to process, then polling occurs again and a branch hit rate is high but a miss rate is low. If packets are received and are available for processing, then the packets are sent to normal processing flow, and the branch hit rate is low but the miss rate is high. According to various embodiments, the polling rate of another core can be modified based on inferred levels received packet processing from a ratio of (branch hit divided by branch miss).

In some embodiments core 202-0 can modify core 202-0 characteristics based on request from core 202-1. For example, in accordance with embodiments described herein, core 202-1 can read contents of shared buffer 206 to determine whether to adjust performance of core 202-0 and core 202-1 can instruct a software executing on core 202-0 to modify its own activity level of core 202-0 by modification of a register (e.g., PTM registers 201).

Figure 4A:
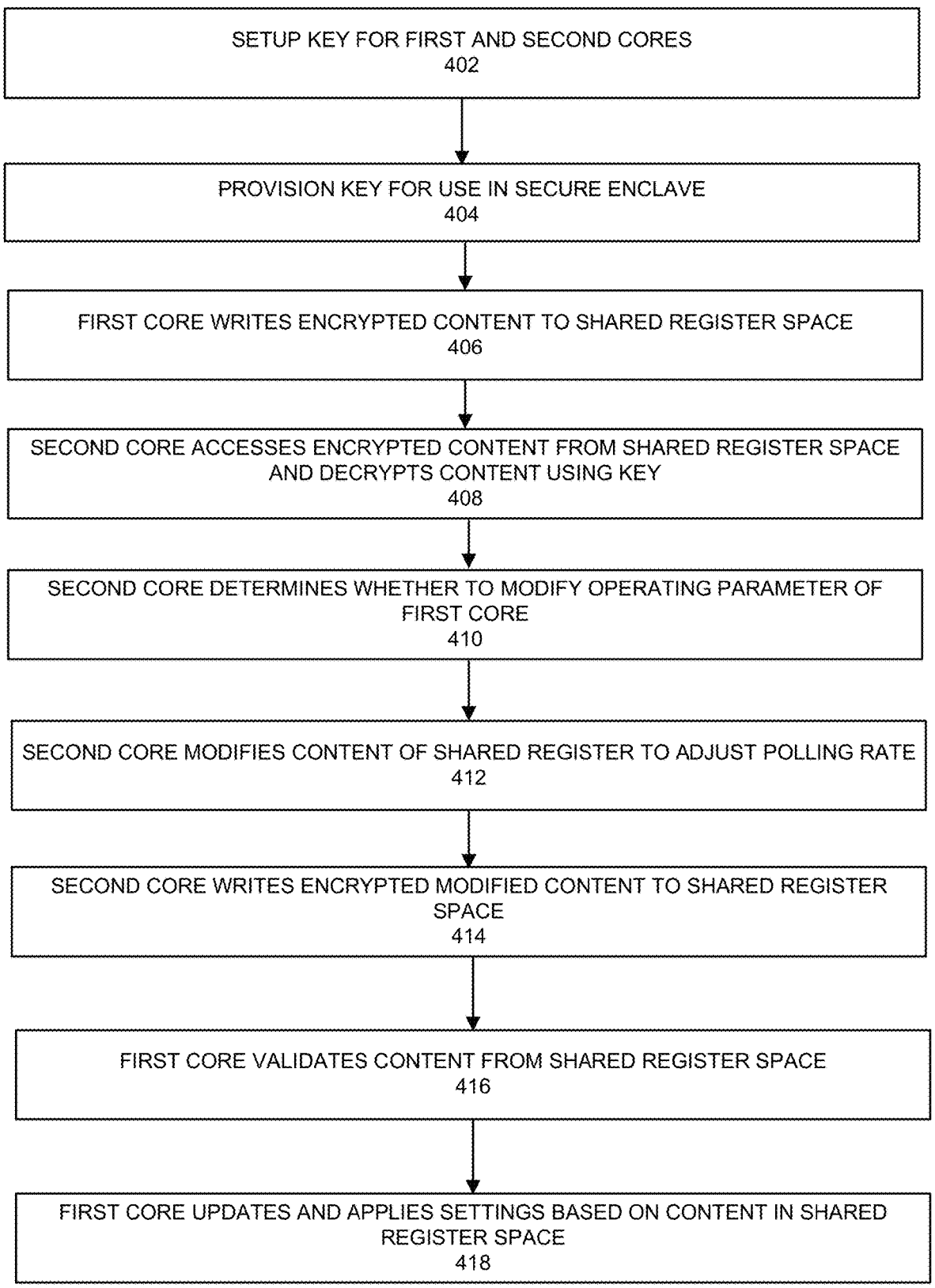
FIGS. 4A-4C depict example processes.

FIG. 4A depicts an example process. The process can be performed by multiple cores where a first core performs a packet processing operation (or other operations) and a second core manages power use of the first core. At 402, a private key is setup for use by a first core and a second core. For example, a system administrator or a remote key center can setup a key for the first and second cores by providing the key with the BIOS or creation of the key during execution of the BIOS by the first core and second core. The key can be used for the first core to encrypt data (e.g., PTM or PMU registers) that are copied to a Register Address Space in a register shared by the first and second cores.

At 404, a key can be provisioned to be used for use in a secure enclave. For example, a secure enclave can be a region of memory that is only accessible by selected processes or instructions. The secure enclave can be secure and isolated processor element (e.g., a second core) with isolated memory space (accessible to authorized processes or instructions). Processes or instructions executed by the second core can use the key to decrypt content in the isolated region of memory. Using a secure enclave can protect the key from not being accessed in an unauthorized manner, so only an authorized process (e.g., power management process) can use it.

At 406, the first core writes encrypted content of at least one register to a shared register space. Content of at least one register can include PTM registers and PMU registers. Content of registers can include operational performance or settings of the first core such as branch hit/miss measurements. The first core can use the key to encrypt the copied content prior to storing encrypted content in the shared register space. In some examples, in addition or alternatively, the first core can generate an HMAC over the encrypted copied content and provide the HMAC in the shared register space.

At 408, the second core can access encrypted content from a shared register space and decrypt the content using the key. For example, a power management process executing on the second core can make use of the secure enclave to decrypt content in the shared register and decrypt the content with its key. The content can have an associated HMAC. The power management process can read the HMAC to validate the encrypted data from the shared register space and decrypt the content if the data is validated (e.g., provided by the first core using a common key).

At 410, the second core can determine whether to change an operating parameter of the first core. For example, a power management process executed by the second core can read a copy of PMU registers from the shared register. The power management process can read the "branch hit/miss" registers from PMU registers to determine a branch hit/miss ratio. If a network interface is determined to be idle or underutilized based on the branch hit/miss ratio, the power management process executed by the second core can decide to reduce the polling rate. The power management process executed by the second core can decide to increase a polling rate based on the branch hit/miss ratio identify a core needs to recognize and process received packets faster.

At 412, the second core can modify content of the shared register to adjust a polling rate. For example, a power management process executed by the second core can modify a register value or values to reduce or increase a polling rate applied by the first core.

At 414, the second core can write the encrypted modified register content with HMAC to the shared register space. The modified register content can be modified PTM register content. The power management process executed by the second core can encrypt the modified register using the key and append an HMAC. The HMAC can be calculated over the encrypted modified register content and can be used to verify integrity of the register content or its source.

At 416, the first core performs decryption of the encrypted modified register content. When the shared (e.g., uncore) register address space has an update, the uncore or system agent notifies the first core, and the first core can pull (copy) the revised PTM registers from the shared register space. The first core can validate the register content. For example, the HMAC can be decrypted to determine if the content is valid and, if the content is valid, the key can be used to decrypt the register content.

At 418, the first core updates and applies settings based on content in the shared register space. Thereafter, the first core can apply the revised power frequency setting to adjust a polling frequency.

Figure 4B:
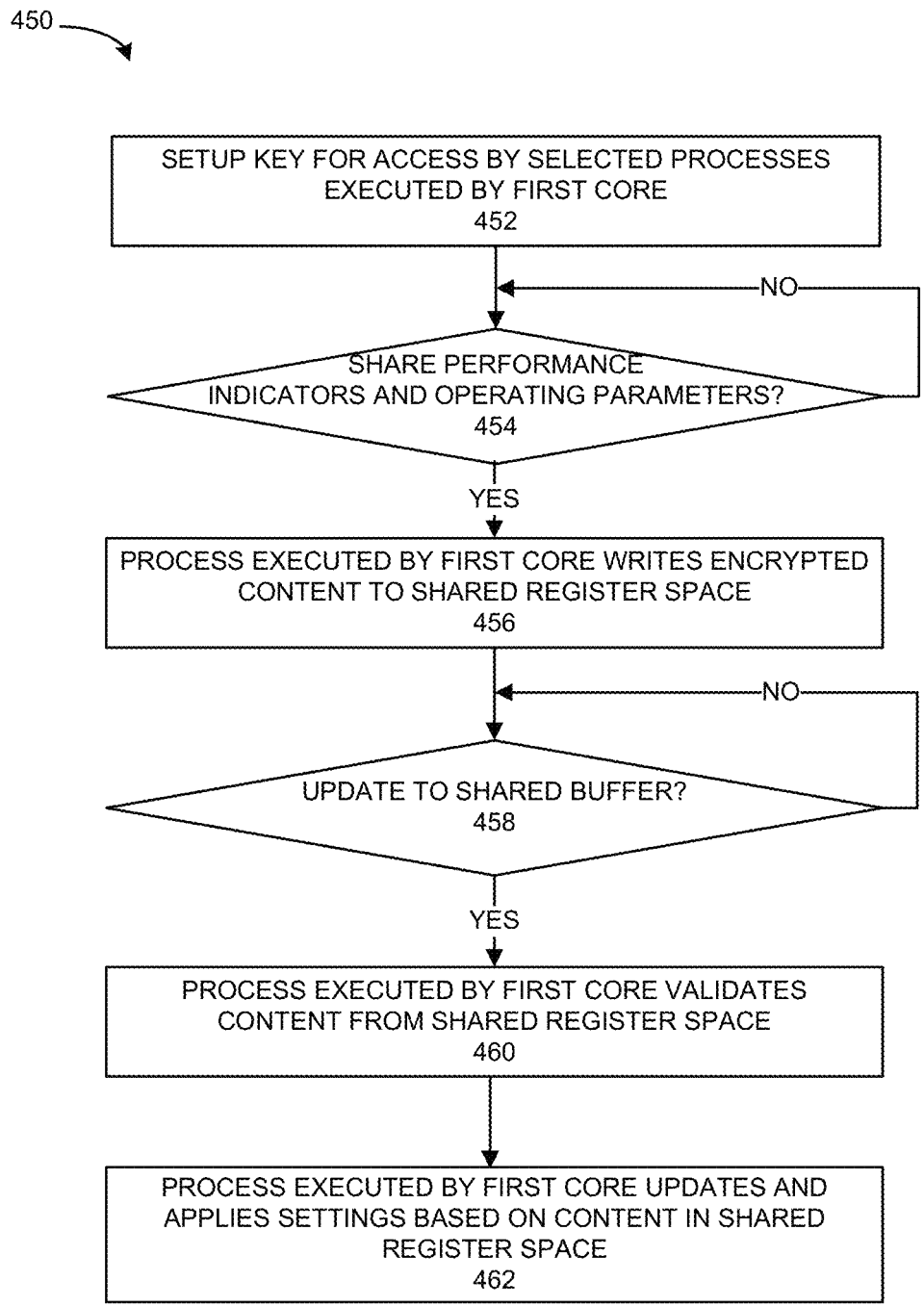

FIG. 4B depicts a process that can be performed to permit performance information of a first core to be shared with a second core. Process 450 can be performed by the first core whereas process 470 (FIG. 4C) can be performed by the second core. At 452, a key is setup for access by a first core. A remote entity or administrator can provision the key. For example, a system administrator or a remote key center can setup a key for the first and second cores by providing the key with the BIOS or creation of the key during execution of the BIOS by the first core and second core. The key can be used for the first core to encrypt data (e.g., PTM or PMU registers) that are copied to a Register Address Space in a register shared by the first and second cores.

At 454, a determination is made whether performance indicators and operating parameters of the first core are to be shared. For example, a timer expiration can indicate performance indicators and operating parameters of the first core are to be shared. For example, an update to a register can indicate performance indicators and operating parameters of the first core are to be shared. For a determination that performance indicators and operating parameters of the first core are to be shared, the process continues to 456. For a determination that performance indicators and operating parameters of the first core are not to be shared, 454 repeats.

At 456, a process executed by the first core encrypts content of various registers and writes the encrypted content to a shared buffer. The various registers can be Power and Thermal Management (PTM) register and/or performance monitoring unit (PMU) register. Content can include branch hit and miss information. Contents of the registers are encrypted first, and then the HMAC can be computed over the encrypted content using the key as represented by the function HMAC(Encrypted Data, Key). The HMAC can be provided to the shared buffer with the encrypted content. HMAC need not be used however.

At 458, a determination is made if there is an update to the shared buffer. If there is an update to the shared buffer, 460 follows. If there is not an update to the shared buffer, 458 can repeat.

At 460, a process executed by the first core can validate content of the shared buffer. Validation of the content can include computation of the HMAC of the encrypted content using the key and comparison of the computed HMAC value with an HMAC read from the shared buffer. If there is a match, the process decrypts the content using the key. Otherwise, the process discards the content.

At 462, the process updates registers of the first core with the decrypted content from the shared buffer. For example, the PTM register can be updated. The updated registers can control operation of the first core such as operating clock frequency of the first core or polling rate of the network interface for received packets by the first core.

Figure 4C:
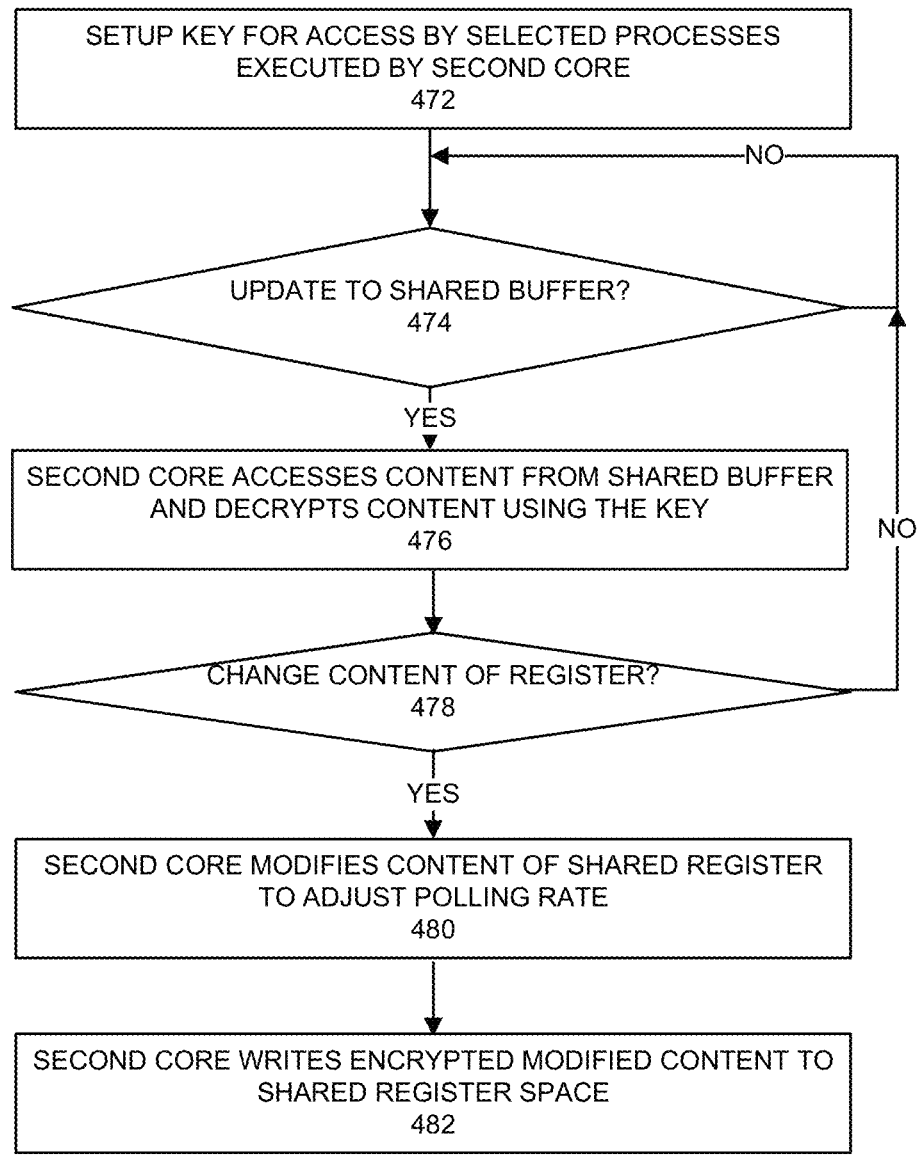

FIG. 4C depicts a process 470 that can be performed by a second core. At 472, a key is setup for access by a second core as well as by a first core. A remote entity or administrator can provision the key. The key can be generated or accessed upon execution of a BIOS by the second core. In some examples, a secure enclave is provisioned and only the code running in enclave can access the key. In some examples, a power management process executes in the secure enclave. The power management process executing on the second core can retrieve the key from the enclave and use the key to decrypt register content of the first core and copied to a shared buffer.

At 474, a determination is made if a process executed on the second core is to access content from the shared buffer. If there is an update to the shared buffer, 476 follows. If there is not an update to the shared buffer, 474 can repeat.

At 476, the second core accesses content from the shared buffer. The second core can execute a process that accesses the content from the shared buffer and validates the content. For example, the process can validate content of the shared buffer. Validation of the content can include computation of the HMAC of the encrypted content using the key and comparing the HMAC value with an HMAC read from the shared buffer. If there is a match, the process decrypts the content using the key. Otherwise, the process discards the content.

At 478, the second core determines whether to modify content read from the shared buffer. For example, a power management process executed by the second core can read a copy of PMU registers from the shared register. The power management process can read the "branch hit/miss" registers from PMU registers to determine whether to modify or not modify an operating parameter of the first core based on a comparison of a branch hit/miss ratio with a threshold. If the content from the shared register is to be modified, the process continues to 480. If the content from the shared register is not to be modified, the process continues to 474.

At 480, the second core modifies content to adjust a polling rate of the first core. If a network interface is determined to be idle or underutilized based on the branch hit/miss ratio, the power management process executed by the second core can decide to reduce the polling rate. Alternatively, the power management process executed by the second core can decide to increase a polling rate based on the branch hit/miss ratio.

At 482, the second core encrypts the modified content and writes the encrypted content to the shared buffer. A process executed by the second core can encrypt the modified register using the key and append an HMAC. The HMAC can be calculated over the encrypted modified register content and can be used to validate content of the register. Thereafter, a first core can access the updated register content and change operating parameters based on the updated register content.

Figure 5:
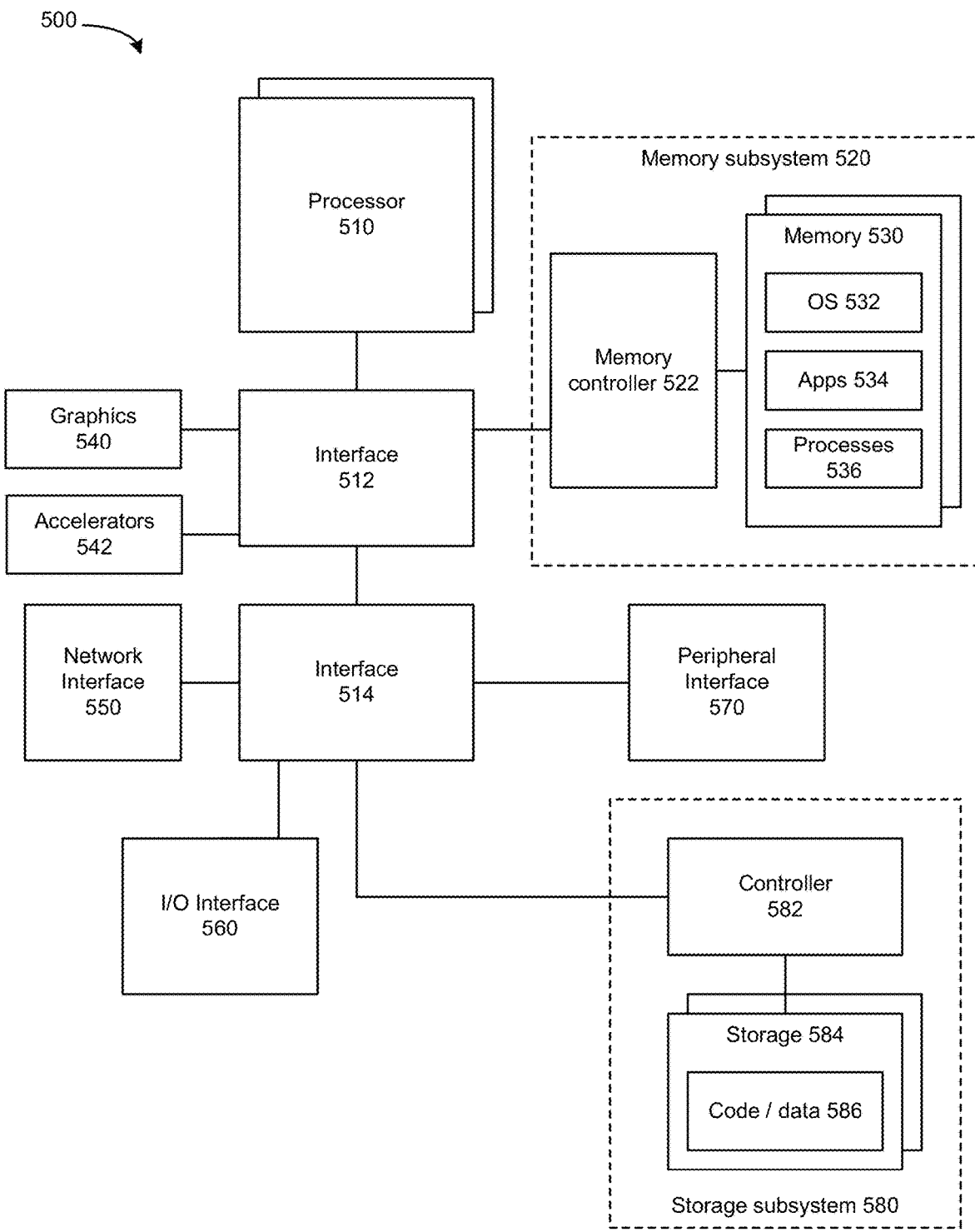
FIG. 5 depicts an example system.

FIG. 5 depicts an example system. The system can use embodiments described herein to share operating parameters of a core with another core and permit another core to modify settings of the first core in accordance with embodiments described herein. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (i.e., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (i.e., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 6:
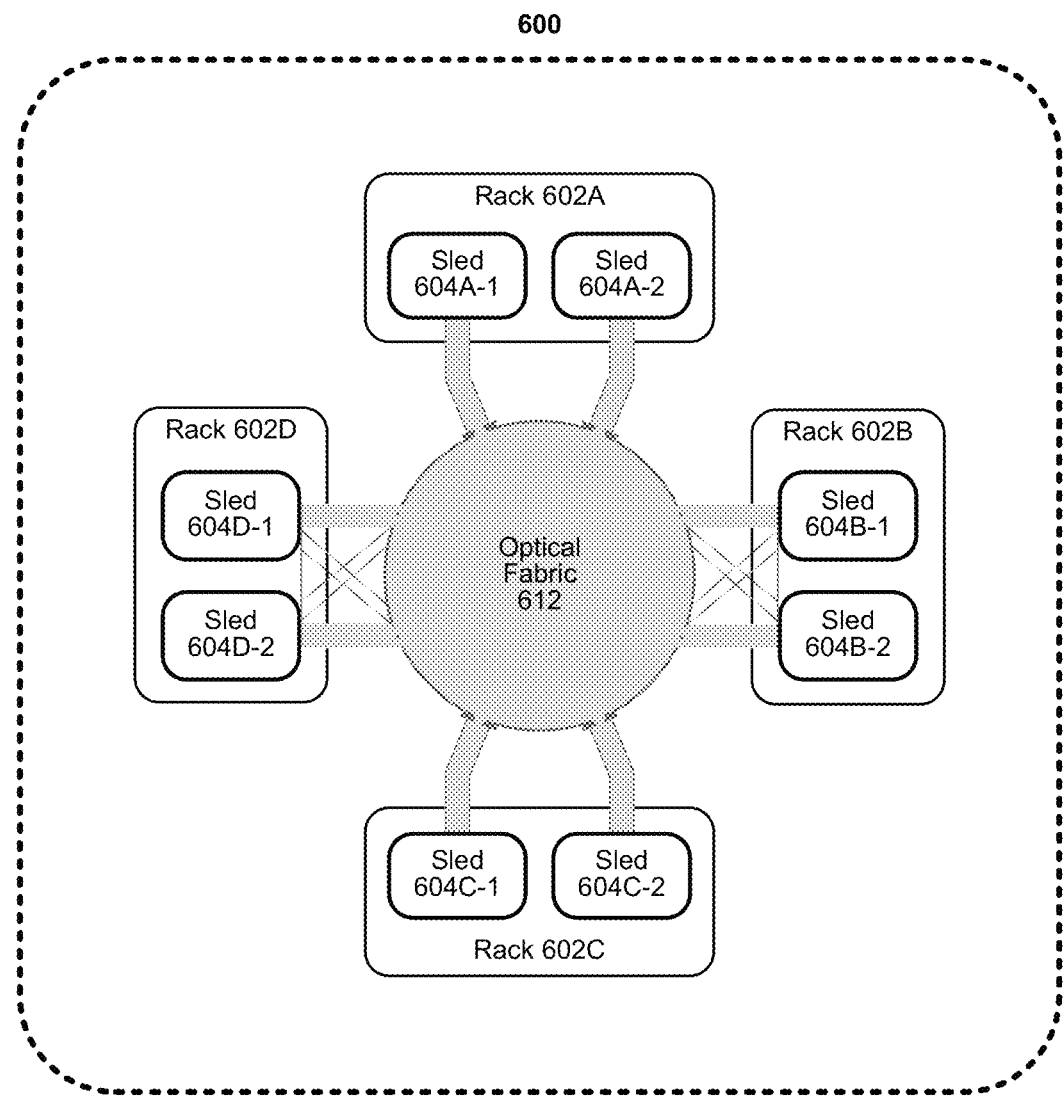
FIG. 6 depicts a system.

FIG. 6 depicts an example of a data center. As shown in FIG. 6, data center 600 may include an optical fabric 612. Optical fabric 612 may generally include a combination of optical signaling media (such as optical cabling) and optical switching infrastructure via which any particular sled in data center 600 can send signals to (and receive signals from) each of the other sleds in data center 600. The signaling connectivity that optical fabric 612 provides to any given sled may include connectivity both to other sleds in a same rack and sleds in other racks. Data center 600 includes four racks 602A to 602D and racks 602A to 602D house respective pairs of sleds 604A-1 and 604A-2, 604B-1 and 604B-2, 604C-1 and 604C-2, and 604D-1 and 604D-2. Thus, in this example, data center 600 includes a total of eight sleds. Optical fabric 612 can provide each sled signaling connectivity with one or more of the seven other sleds. For example, via optical fabric 612, sled 604A-1 in rack 602A may possess signaling connectivity with sled 604A-2 in rack 602A, as well as the six other sleds 604B-1, 604B-2, 604C-1, 604C-2, 604D-1, and 604D-2 that are distributed among the other racks 602B, 602C, and 602D of data center 600. The embodiments are not limited to this example.

Figure 7:
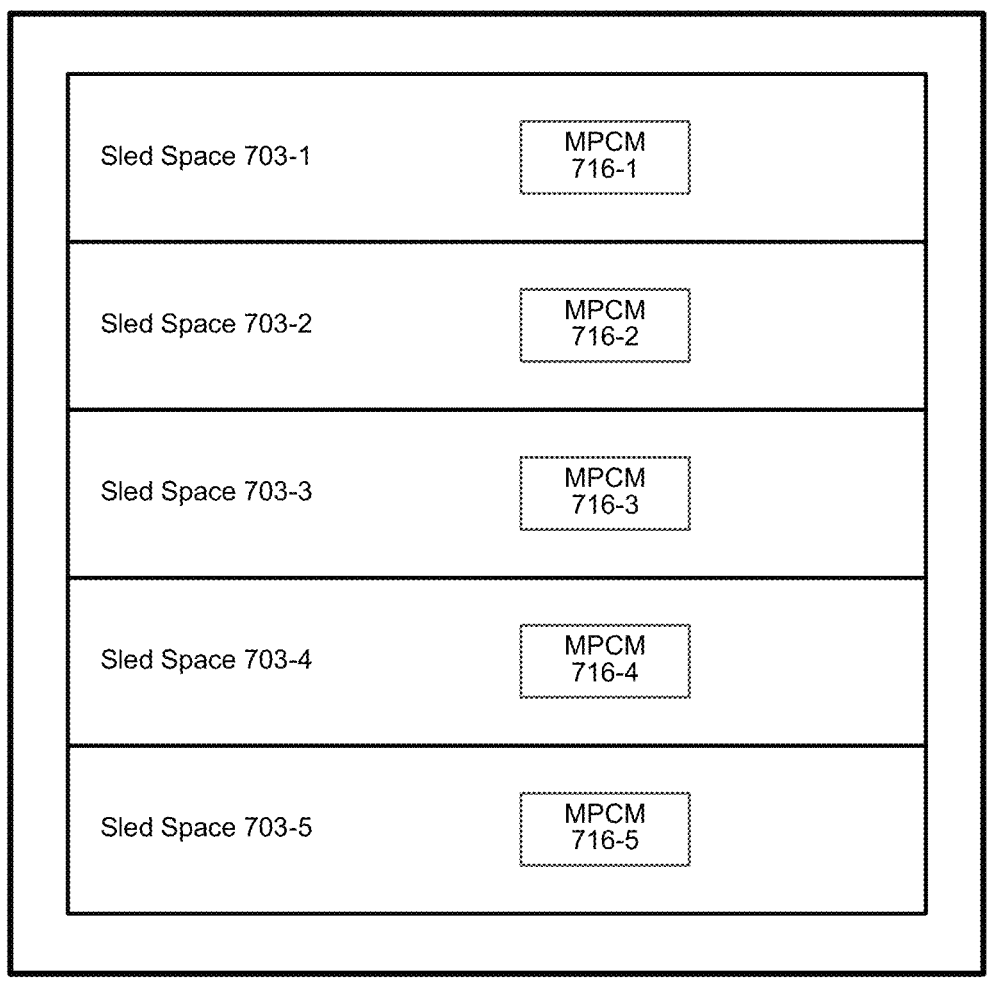
FIG. 7 depicts a system.

FIG. 7 depicts a rack architecture such that a plurality of sled spaces can have sleds inserted. Sled spaces can be robotically-accessible via a rack access region 701. In the particular non-limiting example, rack architecture 700 features five sled spaces 703-1 to 703-5. Sled spaces 703-1 to 703-5 feature respective multi-purpose connector modules (MPCMs) 716-1 to 716-5.

Figure 8:
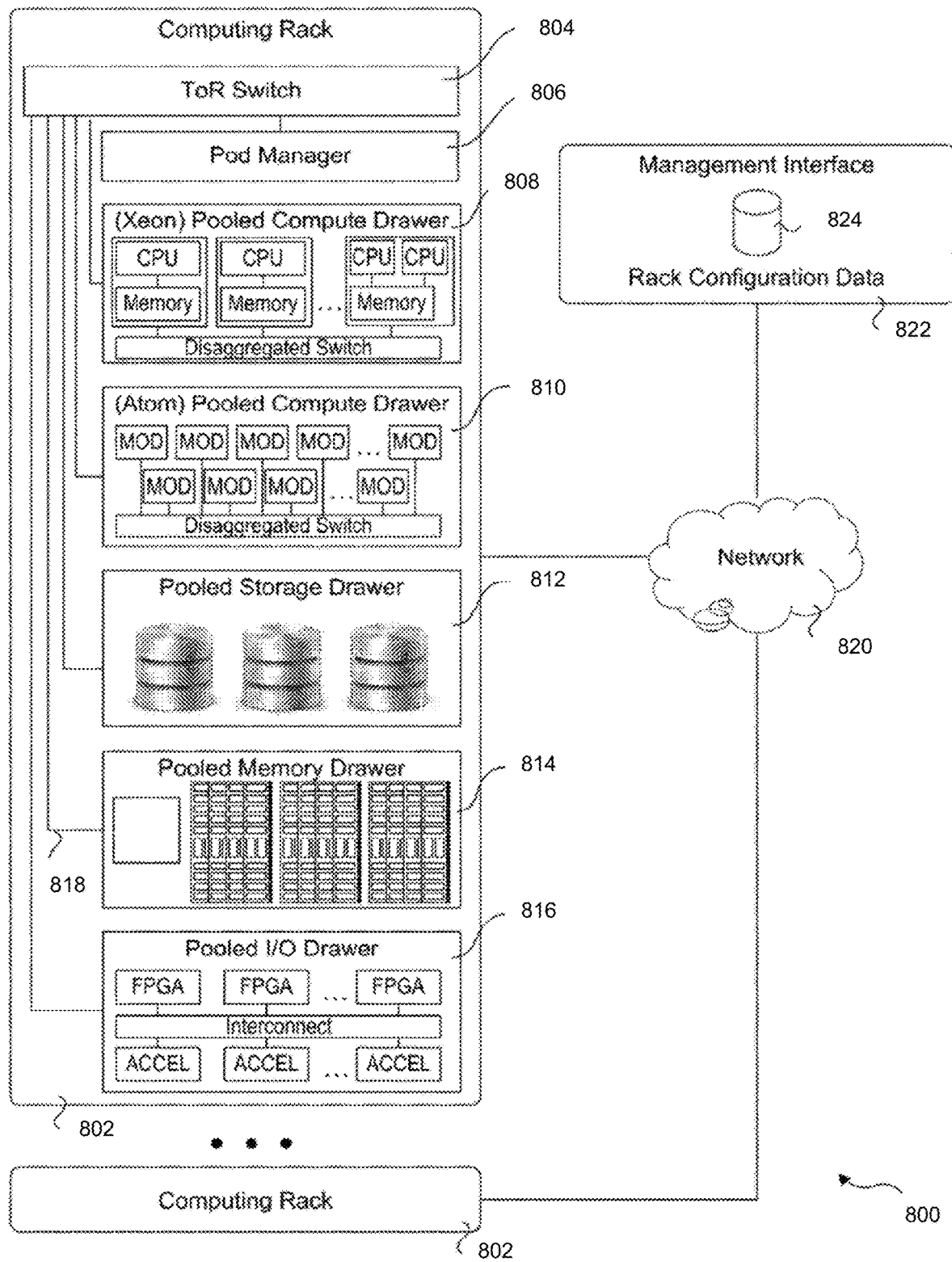
FIG. 8 depicts an example environment.

FIG. 8 depicts an environment 800 includes multiple computing racks 802, each including a Top of Rack (ToR) switch 804, a pod manager 806, and a plurality of pooled system drawers. Generally, the pooled system drawers may include pooled compute drawers and pooled storage drawers. Optionally, the pooled system drawers may also include pooled memory drawers and pooled Input/Output (I/O)

drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+ Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

Figure 9:
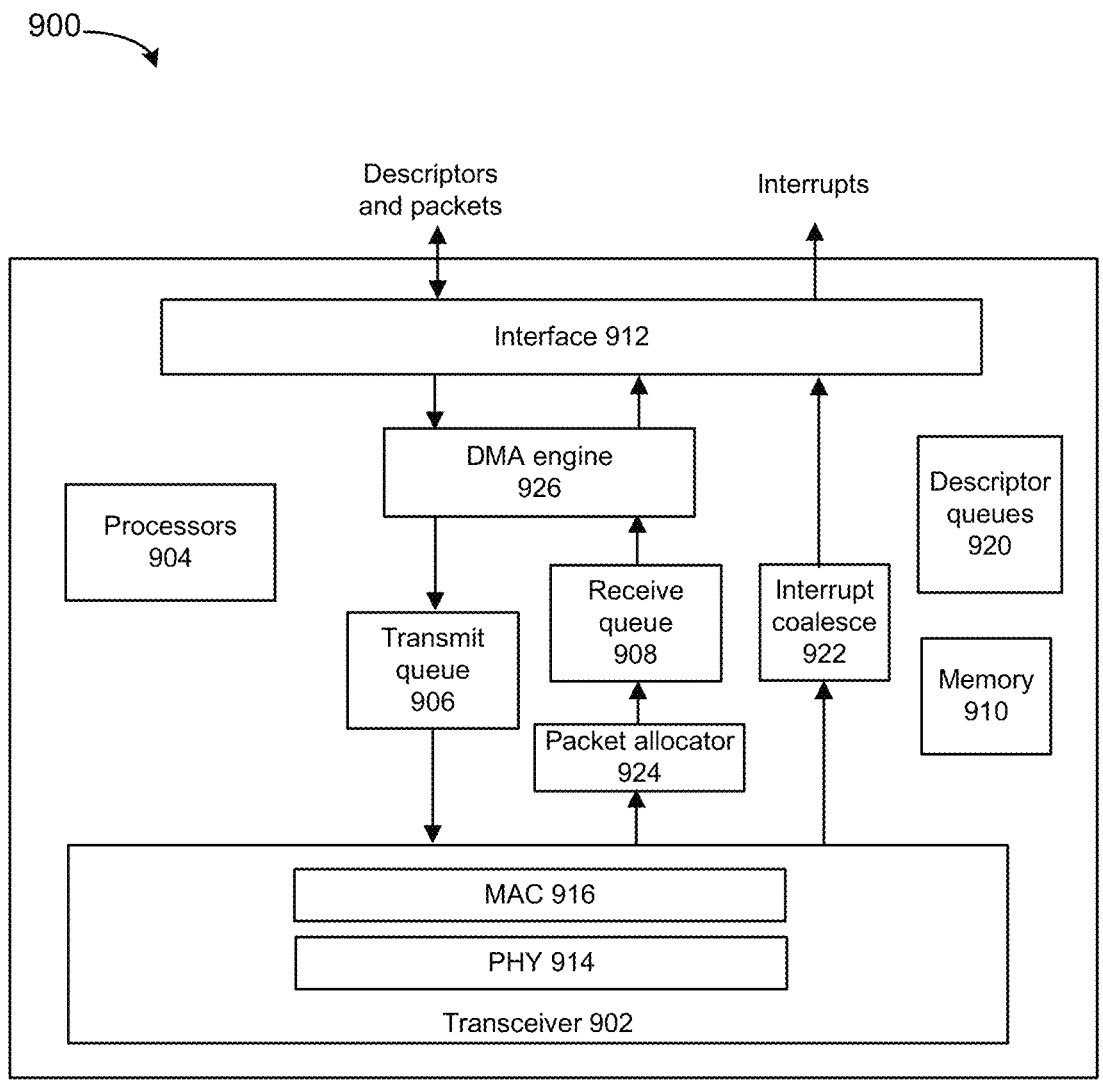
FIG. 9 depicts a network interface that can use embodiments or be used by embodiments.

FIG. 9 depicts a network interface that can use embodiments or be used by embodiments. Various processors of network interface 900 can use techniques described herein to provision operating parameters of a core of processors 904. For example, if a first core of processors 904 performs packet processing and a second core of processor 904 performs a power management process, the second core can modify operating parameters of the first core in accordance with embodiments described herein.

Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any a combination of a: processor, core, graphics processing unit (GPU), field programmable gate array (FPGA), application specific integrated circuit (ASIC), or other programmable hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

An example includes: measurement of packet processing activity includes measurement of a portion of a performance monitoring unit (PMU) register of the first core, the PMU register includes a branch hit/miss measurement, the second core is to execute a power management process to determine a network interface activity level based on the branch hit/miss measurement, and selectively modifying a level of activity of a first core based on the encrypted measurement of packet processing activity, where a second core is to selectively modify a frequency of operation of the first core based on the branch hit/miss measurement.

Example 1 includes an apparatus that includes a memory and a central processing unit (CPU) coupled to the memory, the CPU comprising a first core and a second core, wherein: the first core is to copy a measurement of processing activity performed using the first core and share the measurement of processing activity with the second core, the second core to selectively modify a level of activity of the first core based on the measurement of processing activity, and the first core is different from the second core.

Example 2 includes any example, wherein the measurement of processing activity comprises a branch hit/miss measurement.

Example 3 includes any example, wherein the processing activity comprising packet processing and wherein the first core is to perform Data Plane Development Kit (DPDK) or OpenDataPlane (ODP) compatible packet processing and is to poll a network interface to identify any received packet at a rate according to a frequency setting of the first core.

Example 4 includes any example, wherein the second core is to adjust a frequency of operation of the first core based on a level of measurement of processing activity relative to at least one threshold.

Example 5 includes any example, wherein to copy a measurement of processing activity performed using the first core and share the measurement of processing activity with the second core, the first core is to utilize a key to encrypt a measurement of processing activity performed using the first core and share the encrypted measurement of processing activity with the second core.

Example 6 includes any example, wherein to utilize a key to encrypt a measurement of processing activity performed using the first core and share the encrypted measurement of processing activity with the second core comprises one or more of: the first core is to encrypt at least a portion of performance and operations registers using the key; the first core is to copy the encrypted at least a portion of performance and operations registers into a shared buffer region; the second core is to read the encrypted at least a portion of performance and operations registers from the shared buffer region; or the second core is to decrypt the encrypted at least a portion of performance and operations registers using the key.

Example 7 includes any example, wherein: the measurement of processing activity includes a portion of a performance monitoring unit (PMU) register of the first core, the PMU register includes a branch hit/miss measurement, the second core is to execute a power management process to determine a network interface activity level based on the branch hit/miss measurement, and to selectively modify a level of activity of the first core based on the measurement of processing activity, the second core is to selectively modify a frequency of operation of the first core based on the branch hit/miss measurement.

Example 8 includes any example, wherein: to selectively modify a level of activity of the first core based on the measurement of processing activity: the second core is to perform one or more of the following: selectively modify a frequency of operation of the first core by modification of a portion of a Power and Thermal Management (PTM) register of the first core, encrypt the modified portion of the PTM, or copy the encrypted modified portion of the PTM into a shared buffer region, and the first core is to perform one or more of the following: copy the encrypted modified portion of the PTM from the shared buffer region, decrypt the encrypted modified portion of the PTM, or poll a network interface for received packets according to the frequency of operation specified in the modified portion of the PTM.

Example 9 includes any example, wherein: the second core is to use a secure enclave to decrypt the measurement of processing activity using a key.

Example 10 includes any example, wherein the first core is to share the measurement of processing activity with the second core using a register address space and the second core is to modify a level of activity of the first core using the register address space.

Example 11 includes any example, and includes a network interface communicatively coupled to the first core.

Example 12 includes any example, and includes a data center, server, rack, host computer, or compute sled.

Example 13 includes a method comprising: configuring at least one operating parameter of a first core using a second core by: copying the at least one operating parameter and performance measurement of the first core to a shared buffer accessible by the second core.

Example 14 includes any example, wherein a performance measurement comprises a branch hit/miss measurement.

Example 15 includes any example, wherein the copying the at least one operating parameter and performance measurement of the first core to a shared buffer accessible by the second core comprises the first core encrypting the at least one operating parameter and performance measurement of the first core and storing the encrypted at least one operating parameter and performance measurement of the first core in the shared buffer.

Example 16 includes any example, and includes the second core modifying at least one operating parameter, encrypting the at least one operating parameter, and copying the encrypted at least one modified operating parameter into the shared buffer and the first core adjusting its operating based on the encrypted at least one modified operating parameter.

Example 17 includes any example, and includes: configuring the first and second cores with a common key, wherein the first and second cores encrypt or decrypt shared content using the common key.

Example 18 includes a system that includes a network interface; a register; a first core to perform processing of a packet received by the network interface and copy at least one operating parameter and performance measurement of the first core to the register; and a second core to adjust a polling rate for received packets applied by the first core by adjustment of the at least one operating parameter from the register.

Example 19 includes any example, wherein the first core is to encrypt at least one operating parameter and performance measurement of the first core using a key and store the encrypted at least one operating parameter and performance measurement of the first core into the register.

Example 20 includes any example, wherein the second core is to decrypt at least one operating parameter and performance measurement of the first core stored in the register using a copy of the key.

Example 21 includes any example, wherein: the second core is to determine whether to adjust the polling rate for received packets based on at least one performance measurement and based on a determination to adjust the polling rate for received packets, the second core is to modify a portion of the at least one operating parameter and store the modified portion into the register.

Example 22 includes any example, wherein: the first core is to decrypt the at least one operating parameter and performance measurement of the first core from the register and store the decrypted at least one operating parameter and performance measurement of the first core to a register of the first core and the first core is to poll for received packets at a network interface based on the decrypted at least one operating parameter and performance measurement of the first core from the register.

Example 23 includes an apparatus comprising: a memory and a central processing unit (CPU) coupled to the memory, the CPU comprising a first core and a second core, wherein: the first core is to copy a measurement of processor activity performed using the first core and share the measurement of processor activity with the second core, the second core to selectively request the first core to modify a level of activity of the first core based on the measurement of processor activity, and the first core is different from the second core.

Example 24 includes any example, wherein the level of activity comprises a frequency of operation or rate of polling a network interface.

What is claimed is:

1. An apparatus comprising:
an interface and
a central processing unit (CPU) coupled to the interface, the CPU comprising a first core and a second core, wherein:
the first core is to copy a measurement of processing activity performed using the first core and share the measurement of processing activity with the second core,
the second core to selectively modify a level of activity of the first core based on the measurement of processing activity, and
the first core is different from the second core.

2. The apparatus of claim 1, wherein the measurement of processing activity comprises a branch hit / miss measurement.

3. The apparatus of claim 1, wherein the processing activity comprising packet processing and wherein the first core is to perform packet processing based on Data Plane Development Kit (DPDK) or OpenDataPlane (ODP) and is to poll a network interface to identify at least one received packet at a rate according to a frequency setting of the first core.

4. The apparatus of claim 1, wherein the second core is to adjust a frequency of operation of the first core based on a level of the measurement of processing activity.

5. The apparatus of claim 1, wherein to copy the measurement of processing activity performed using the first core and share the measurement of processing activity with the second core, the first core is to utilize a key to encrypt the measurement of processing activity performed using the first core and share the encrypted measurement of processing activity with the second core.

6. The apparatus of claim 5, wherein to utilize a key to encrypt the measurement of processing activity performed using the first core and share the encrypted measurement of processing activity with the second core comprises one or more of:
the first core is to encrypt at least a portion of content of performance and operations registers using the key;
the first core is to copy the encrypted at least the portion of content of the performance and operations registers into a shared buffer region;
the second core is to read the encrypted at least the portion of content of the performance and operations registers from the shared buffer region; or
the second core is to decrypt the encrypted at least the portion of content of the performance and operations registers using the key.

7. The apparatus of claim 1, wherein:
the measurement of processing activity includes a portion of content of a performance monitoring unit (PMU) register of the first core,
the PMU register includes a branch hit / miss measurement,
the second core is to execute a power management process to determine a network interface activity level based on the branch hit / miss measurement, and
to selectively modify a level of activity of the first core based on the measurement of processing activity, the second core is to selectively modify a frequency of operation of the first core based on the branch hit / miss measurement.

8. The apparatus of claim 1, wherein:
to selectively modify a level of activity of the first core based on the measurement of processing activity, the second core is to perform one or more of the following:
selectively modify a frequency of operation of the first core by modification of a portion of content a Power and Thermal Management (PTM) register of the first core,
encrypt the modified portion of content of the PTM, or
copy the encrypted modified portion of content of the PTM into a shared buffer region, and
the first core is to perform one or more of the following:
copy the encrypted modified portion of content of the PTM from the shared buffer region,
decrypt the encrypted modified portion of content of the PTM, or
poll a network interface for received packets according to the frequency of operation specified in the modified portion of content of the PTM.

9. The apparatus of claim 1, wherein:
the second core is to use a secure enclave to decrypt the measurement of processing activity using a key.

10. The apparatus of claim 1, wherein the first core is to share the measurement of processing activity with the second core using a register address space and the second core is to modify a level of activity of the first core using the register address space.

11. The apparatus of claim 1, further comprising:
a network interface communicatively coupled to the first core.

12. The apparatus of claim 1, comprising a data center, server, rack, host computer, or compute sled and wherein the data center, server, rack, host computer, or compute sled comprises the interface and the CPU.

13. The apparatus of claim 1, comprising at least one memory coupled to the interface.

14. A method comprising:
configuring first and second cores with a common key, wherein the first and second cores encrypt or decrypt shared content using the common key and
configuring at least one operating parameter and performance measurement of the first core using the second core by:
copying the at least one operating parameter and performance measurement of the first core to a shared buffer accessible by the second core.

15. The method of claim 14, wherein the performance measurement comprises a branch hit / miss measurement.

16. The method of claim 14, wherein the copying the at least one operating parameter and performance measurement of the first core to a shared buffer accessible by the second core comprises the first core encrypting the at least one operating parameter and performance measurement of the first core and storing the encrypted at least one operating parameter and performance measurement of the first core in the shared buffer.

17. The method of claim 14, comprising:
the second core performing: modifying at least one operating parameter, encrypting the at least one operating parameter, and copying the encrypted at least one modified operating parameter into the shared buffer and
the first core adjusting its operating based on the encrypted at least one modified operating parameter.

18. A system comprising:
a network interface;
a register;

a first core to perform processing of a packet received by the network interface and copy at least one operating parameter and performance measurement of the first core to the register; and a second core, wherein to adjust a polling rate for received packets applied by the first core, the second core is to adjust the at least one operating parameter from the register.

19. The system of claim 18, wherein the first core is to encrypt the at least one operating parameter and performance measurement of the first core using a key and store the encrypted at least one operating parameter and performance measurement of the first core into the register.

20. The system of claim 19, wherein the second core is to decrypt at least one operating parameter and performance measurement of the first core stored in the register using a copy of the key.

21. The system of claim 19, wherein:

the second core is to determine whether to adjust the polling rate for received packets based on at least one performance measurement and based on a determination to adjust the polling rate for received packets, the second core is to modify a portion of the at least one operating parameter and store the modified portion of the at least one operating parameter into the register.

22. The system of claim 19, wherein:

the first core is to decrypt the at least one operating parameter and performance measurement of the first core from the register and store the decrypted at least one operating parameter and performance measurement of the first core to a register of the first core and the first core is to poll for received packets at the network interface based on the decrypted at least one operating parameter and performance measurement of the first core from the register.

23. An apparatus comprising:

an interface and a central processing unit (CPU) coupled to the interface, the CPU comprising a first core and a second core, wherein:

the first core is to copy a measurement of processor activity performed using the first core and share the measurement of processor activity with the second core, the second core to selectively request the first core to modify a level of activity of the first core based on the measurement of processor activity, and the first core is different from the second core.

24. The apparatus of claim 23, wherein the level of activity comprises a frequency of operation or rate of polling a network interface.

25. The apparatus of claim 23, comprising at least one memory coupled to the interface.

26. The apparatus of claim 23, wherein the processor activity comprises packet processing associated with Data Plane Development Kit (DPDK) or OpenDataPlane (ODP) compatible packet processing.

27. An apparatus comprising:

a first core and a second core, wherein the first core comprises circuitry, when operational, to share encrypted performance monitoring data of the first core with the second core and the second core comprises circuitry, when operational, to decrypt the encrypted performance monitoring data and to adjust power consumption of the first core based on the decrypted performance monitoring data.

28. The apparatus of claim 27, wherein the performance monitoring data comprises data from one or more performance monitoring unit (PMU) registers.

29. The apparatus of claim 27, wherein the first core and second core are to share a key for use by the circuitry of the second core to decrypt the encrypted performance monitoring data.

30. The apparatus of claim 27, wherein the encrypted performance monitoring data is stored in a memory and/or register accessible to the circuitry of the second core.

* * * * *